(12) United States Patent
Yeakley et al.

(10) Patent No.: US 7,944,649 B2
(45) Date of Patent: May 17, 2011

(54) MAGNETICALLY PRELOADED ANTI-ROTATION GUIDE FOR A TRANSDUCER

(75) Inventors: Darryl W. Yeakley, Erie, CO (US); Frank A. Goodknight, Niwot, CO (US)

(73) Assignee: Oracle America, Inc., Redwood City, CA (US)

( * ) Notice: Subject to any disclaimer, the term of this patent is extended or adjusted under 35 U.S.C. 154(b) by 1070 days.

(21) Appl. No.: 11/733,814

(22) Filed: Apr. 11, 2007

(65) Prior Publication Data

US 2008/0253031 A1 Oct. 16, 2008

(51) Int. Cl.
*G11B 15/44* (2006.01)
(52) U.S. Cl. .................................... 360/261.1
(58) Field of Classification Search ............... 360/261.1, 360/261.2, 261.3, 291, 291.1, 291.2, 291.3, 360/69, 74.1
See application file for complete search history.

(56) References Cited

U.S. PATENT DOCUMENTS

| | | | |
|---|---|---|---|
| 5,793,574 | A | 8/1998 | Cranson et al. |
| 5,818,668 | A | 10/1998 | Gonzales |
| 5,949,619 | A | 9/1999 | Eckberg et al. |
| 6,437,946 | B2 | 8/2002 | Todd |
| 6,594,118 | B1 | 7/2003 | Nayak et al. |
| 6,985,430 | B1 | 1/2006 | Villiard et al. |

*Primary Examiner* — Craig A. Renner
(74) *Attorney, Agent, or Firm* — Brooks Kushman P.C.

(57) ABSTRACT

A transducer positioning apparatus is provided that supports a read/write head on a data storage machine and biases the head against rotation. The transducer positioning apparatus may comprise a base that includes a linear drive motor and a support frame to which the read/write head is secured. The support frame is reciprocally driven by the linear drive motor relative to the base. A magnetic coupling is provided between the base and the support frame that resists movement of the frame other than the reciprocal movement of the support frame relative to the base. A method is also disclosed for magnetically biasing a movable head of a transducer against rotation.

7 Claims, 6 Drawing Sheets

MAGNETICALLY PRELOADED ANTI-ROTATION GUIDE FOR A TRANSDUCER

BACKGROUND OF THE INVENTION

1. Field of the Invention

The invention relates to an anti-rotation guide for a media drive transducer.

2. Background Art

Anti-rotation guides for transducers are used in media drives to inhibit rotational movement of a transducer when the direction of tape movement is reversed with respect to a tape head. Examples of transducer positioning devices are disclosed in U.S. Pat. Nos. 6,437,946 and 6,985,430.

Anti-rotation guides for transducers are generally preloaded to remove play and minimize undesirable head movements. The most common method of preloading is to use springs that bias the anti-rotation guides. Spring preloading mechanisms may be a source of reliability and performance issues. Reliability and performance problems may arise due to component fatigue, component wear, and unpredictable frictional forces that may occur at preload component interfaces. Such reliability and performance problems may contribute to poor actuator performance and reduced anti-rotation guide and head actuator product life.

Anti-rotation guide spring preload mechanisms are small parts of considerable complexity. The cost of assembling such small, complex parts increases the cost of assembling the anti-rotation guides and head actuator assemblies.

The present invention is directed to overcoming the above problems as summarized below.

SUMMARY OF THE INVENTION

According to one aspect of the present invention, a transducer positioning apparatus is provided that supports a read/write head on a data storage machine. One embodiment of the transducer positioning apparatus comprises a base that includes a linear drive motor. The transducer positioning apparatus also has a support frame to which the read/write head is secured. The support frame is reciprocally driven by the linear drive motor relative to the base. A magnetic coupling is provided between the base and the support frame that resists movement of the frame other than the reciprocal movement of the support frame relative to the base.

According to another aspect of the invention, the magnetic coupling of the transducer positioning apparatus includes a magnet having a magnetic flux field. A ball and a magnetically attracted member are both disposed in the magnetic flux field. The magnetic flux field captures the ball between the magnet and the magnetically attracted member while permitting the magnet and the member to move relative to each other linearly with the ball rolling therebetween.

According to still further aspects of the invention, the magnet may be provided on the base with the magnetically attracted member being provided on the frame. Alternatively, the magnet may be provided on the frame with the magnetically attracted member being provided on the base. In either case, the magnetically attracted member may be a magnet.

According to the another aspect of the invention, an anti-rotation guide is provided for a transducer positioning apparatus of a data storage machine. The anti-rotation guide has a base and a tower extending from the base. A frame is attached to the tower. A transducer head reads and writes data to a storage medium, such as a data storage tape. The transducer head is secured to the frame for limited movement along the tower and toward and away from the base. The transducer head is pivotable to a limited extent relative to the tower about a pivot axis when the storage medium reverses direction. The anti-rotation guide comprises a magnetically attracted portion of the frame that is radially spaced from the pivot axis. A ball is disposed near the magnetically attracted portion of the frame. A magnet attached to the tower acts upon a magnetically attracted portion of the frame to bias the transducer head against rotation about the pivot axis when the storage medium reverses direction. The head rolls on the ball relative to the magnetically attracted portion.

According to other aspects of the invention as it relates to the anti-rotation guide, the ball may be disposed between the magnetically attracted portion of the frame and the magnet. The transducer head rolls on the ball as the head moves toward and away from the base. The anti-rotation guide may further comprise a linear guide track that guides the movement of the frame relative to the tower. The linear guide track may be split into two portions with the first portion being disposed above the magnetically attracted portion of the anti-rotation flange and a second portion being disposed below the magnetically attracted portion of the anti-rotation flange. The tower may provide a slot between the first and second portions of the track in which the magnetically attracted portion of the anti-rotation flange is received. The anti-rotation guide may further comprise a ball disposed between the magnetically attracted portion of the anti-rotation flange and the magnet. The transducer head rolls on the ball as the head moves toward and away from the base. A wear plate may be disposed between the magnet and the ball.

Another aspect of the invention relates to a method of retaining a movable head of a transducer on a base. The transducer used in the method includes a linear motor that operatively engages a frame that supports the head. The frame and the base define an anti-rotation guide for the head. The anti-rotation guide may have a ball disposed between a magnetically attracted portion of the frame (for example, an anti-rotation flange) and a magnet disposed on the base. The method comprises providing a magnetic field that retains the ball in engagement between the magnetically attracted portion of the frame and the magnet. Movement of the tape is tracked in a direction perpendicular to the direction of travel for the tape. A representative signal is provided to a controller that is representative of the movement of the tape in the perpendicular direction. The frame supporting the head is driven by the linear motor in the linear direction in response to a signal from the controller that is based on the representative signal. Rotation of the frame relative to the base is resisted by the magnetic field when the tape changes direction.

According to another aspect of the method of present invention, the magnetically attracted portion of the frame may further comprise an anti-rotation flange extending away from the head that is received by the base. The method further comprises the step of biasing the flange against rotation relative to the head in the direction of travel of the tape.

These and other aspects of the present invention will be better understood in view of the attached drawings and the following detailed description of the illustrated embodiment of the invention.

DETAILED DESCRIPTION OF THE PREFERRED EMBODIMENT(S)

Figure 1:
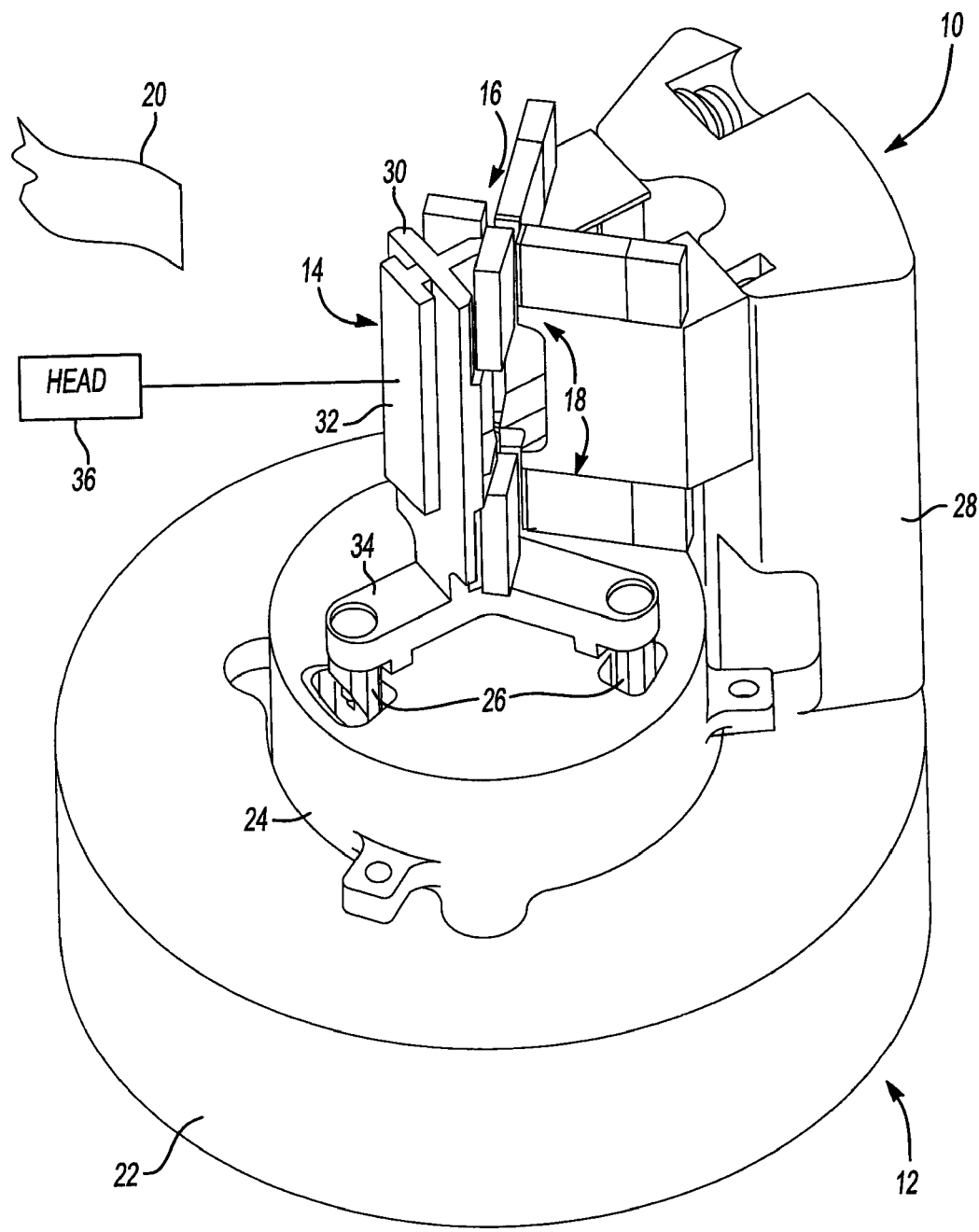
FIG. 1 is an outer perspective view of a head actuator.

Referring to FIG. 1, a transducer head positioning apparatus 10 is illustrated. The transducer head positioning apparatus 10 includes a base assembly 12 and a head assembly 14. The head assembly 14 is supported in part by a linear motion track 16 that is defined by both the base assembly 12 and the head assembly 14. A magnetic coupling system is generally represented by reference numeral 18 that functions in conjunction with the linear motion track 16 to guide the movement of the head assembly 14 relative to the base assembly 12. The head assembly 14 is used to read and write data to a data storage tape 20 in the illustrated embodiment. However, it should be understood that the invention is not limited to tape storage applications and could be adapted, for example, to disk storage applications.

The base assembly 12 includes a base 22 and a linear motor 24. The linear motor 24 has a plurality of legs 26 that operatively engage the head assembly 14 to move the head assembly 14 in a linear direction reciprocally relative to the base 22. The base assembly 12 also includes a tower 28 that extends from the base 22.

The head assembly 14 includes a frame 30 that defines a head support 32. The frame 30 also includes a tripod support 34 that is connected to the three legs 26 of the linear motor 24. A head 36 is attached to the head support 32. The head 36 is a read/write head which may also be referred to as a transducer head that is used to read and write data to a data storage tape or other data storage medium.

Figure 2:
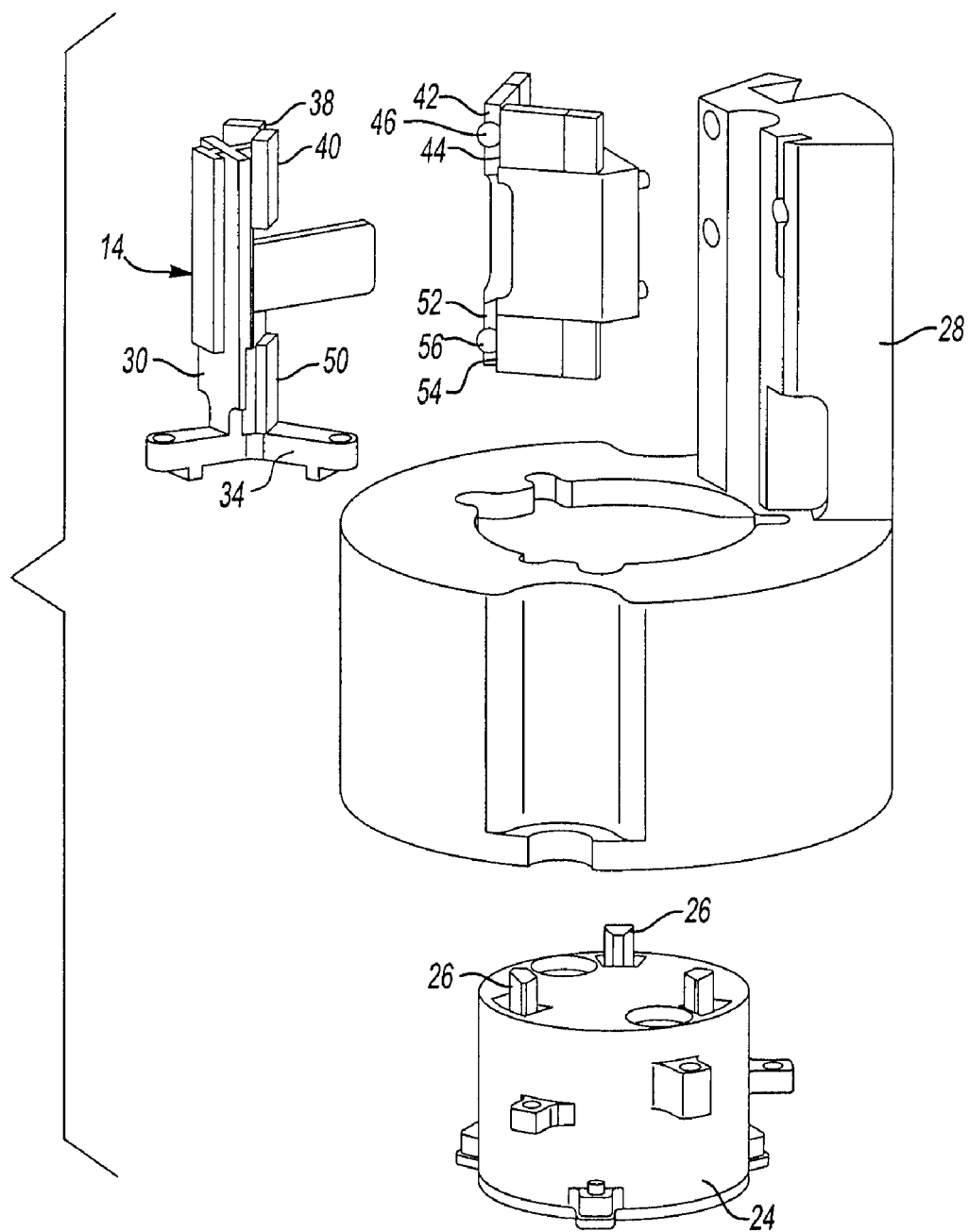
FIG. 2 is a front exploded perspective view of the head actuator.
Figure 3:
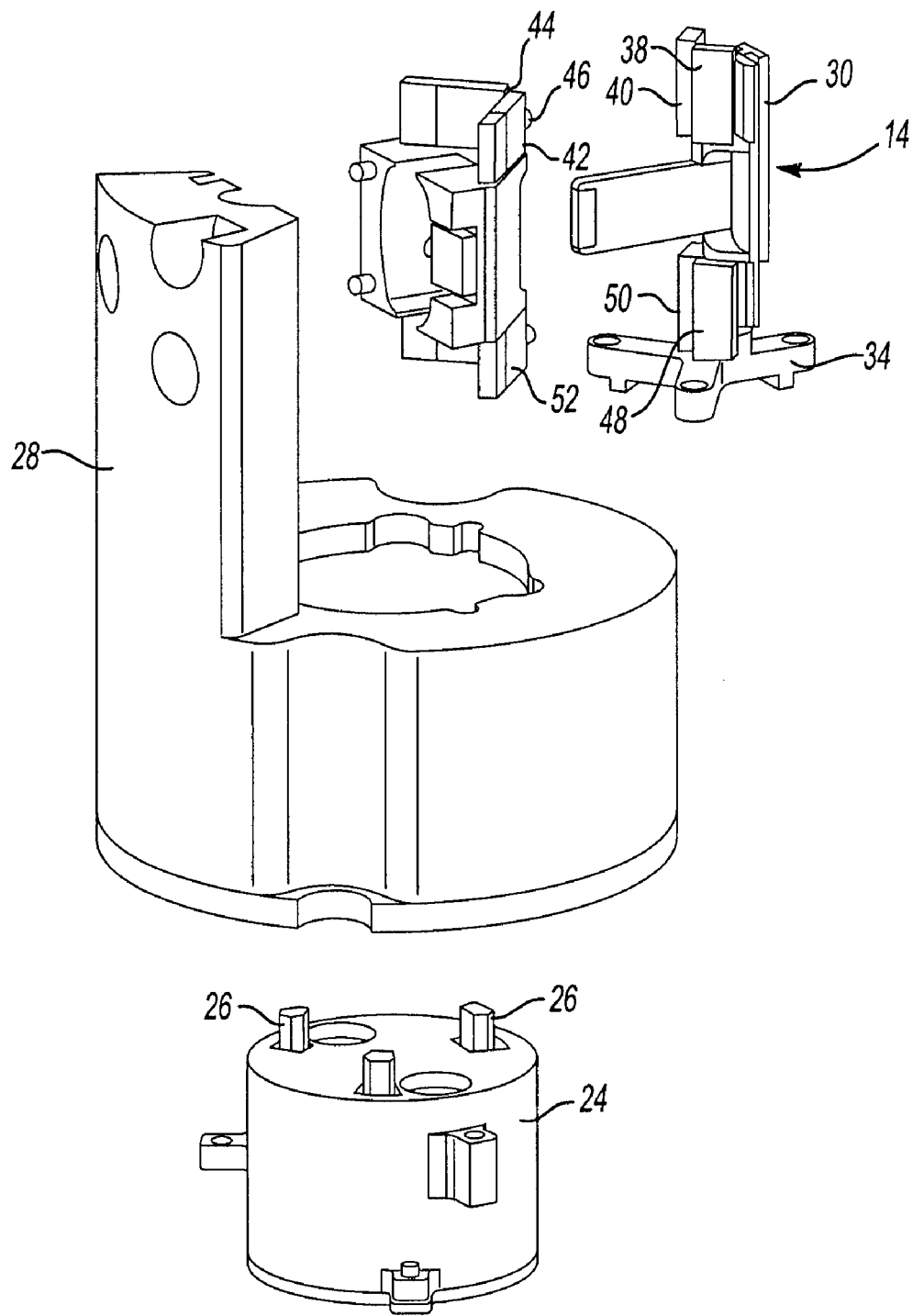
FIG. 3 is a rear exploded perspective view of the head actuator.

Referring to FIGS. 2 and 3, the transducer head positioning apparatus 10 is shown in oppositely oriented exploded perspective views. The linear motion track generally referred to in FIG. 1 by reference numeral 16 is separated into its component parts wherein a first upper movable track 38 and a second upper movable track 40 are provided on the head assembly 14. A first upper stationary track 42 and a second upper stationary track 44 are shown in a facing relationship relative to the first and second upper movable tracks 38 and 40. An upper ball 46 is restrained between the movable tracks 38, 40 and the stationary tracks 42, 44.

First and second lower movable tracks 48, 50 are provided on the frame 30 of the head assembly 14 at locations below the upper movable tracks 38, 40, as viewed in FIG. 2. First and second lower stationary tracks 52, 54 are provided below the first and second upper stationary tracks 42, 44, as illustrated in FIGS. 2 and 3. A lower ball 56 is confined within the movable tracks 48, 50 and the stationary tracks 52, 54.

The track 16 guides movement of the frame 30 in conjunction with the tower 28. The frame 30 is moved by the linear motor 24 that has legs 26 that engage the tripod support 34 of the frame 30. The linear motor 24 drives the legs 26 in a linear direction reciprocally in response to control signals received from a controller (not shown).

Figure 4:
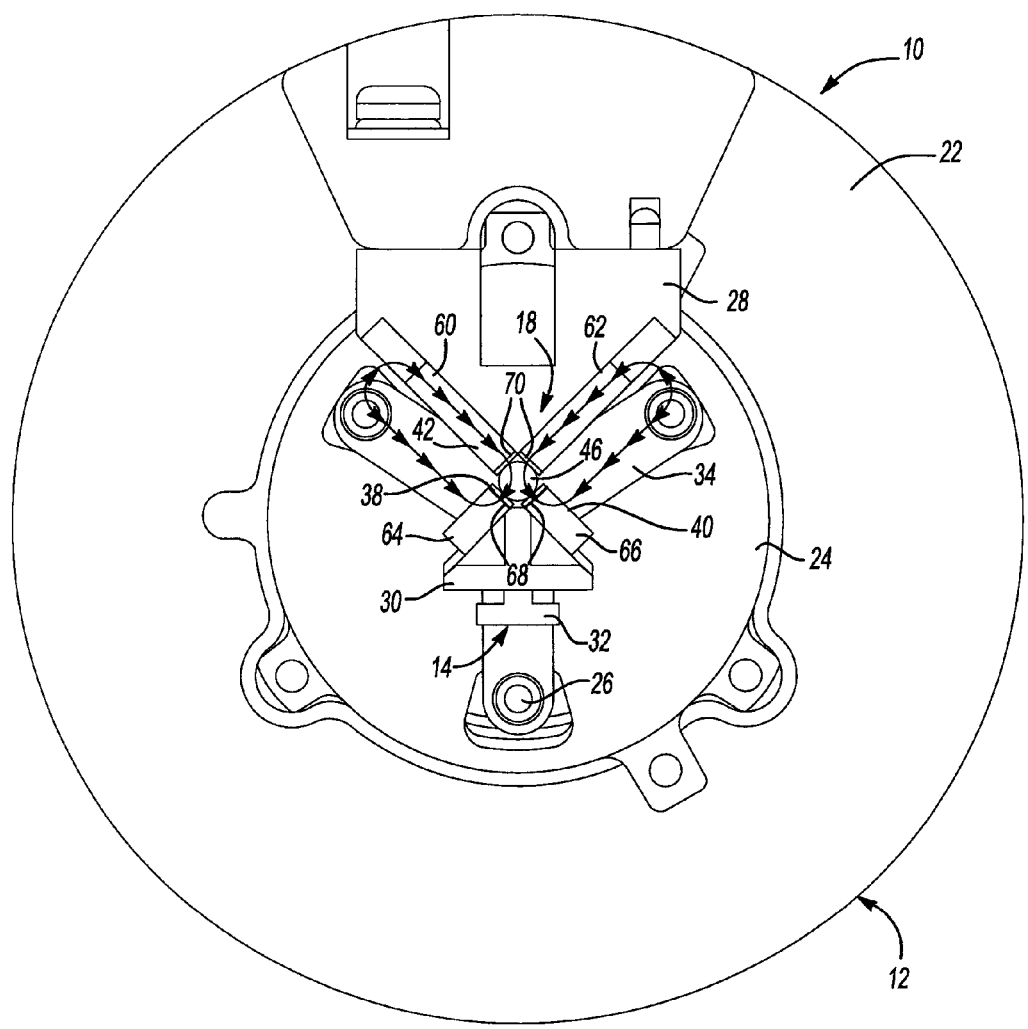
FIG. 4 is a top plan view of the head actuator.

The magnetic coupling system 18 is described by reference to FIG. 4. The transducer head positioning apparatus 10 includes the base assembly 12. The magnetic coupling system 18 retains the frame 30 of the head assembly 14. In the embodiment shown in FIG. 4, the magnetic coupling system 18 includes a first magnet 60 and a second magnet 62 that cooperate with the first magnetically attracted member 64 and the second magnetically attracted member 66 to support the frame 30 on the upper ball 46. A lower portion of the linear motion track 16 is not visible in FIG. 3, but is aligned with the upper portion of the linear motion track 16. The oval line with arrowheads illustrates generally the magnetic flux path of the magnetic coupling system 18. The magnetic flux path holds the ball 46 and magnetically attracted members 64, 66 to the magnets 60, 62. The frame 30 is generally free to move along the linear motion track 16 with upper ball 46 and lower ball 56 providing a rolling support for the frame 30 of the head assembly 14.

The legs 26 of the linear motor 24 engage the tripod support 34 of the head assembly 14 to reciprocally drive the head assembly 14 to track movement of the data storage tape perpendicular to the direction of movement of the data storage tape. Base wear plates 70 and head wear plates 68 are shown on the first and second magnets 60, 62 and on the first and second magnetically attracted members 64, 66, respectively. The wear plates 68, 70 are made of hardened steel or ceramic and reduce wear occurring as a result of the movement of the head assembly 14 as it rolls on the balls 46, 56.

Figure 5:
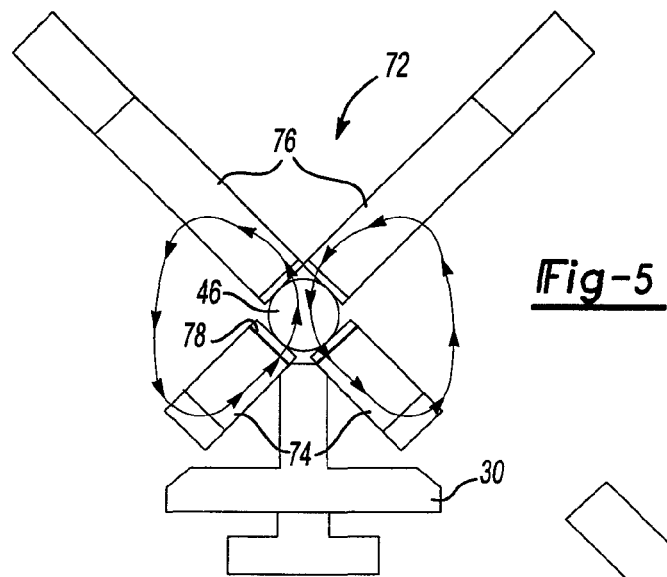
FIG. 5 is a diagrammatic top plan view of an alternative embodiment of a head actuator.

Referring to FIG. 5, a dual magnet track embodiment 72 is shown. The dual magnet track embodiment 72 includes head assembly magnets 74 and base magnets 76 that are arranged to provide a flux path that retains the ball 46 within the linear motion track 16. Ball 46 shown in FIG. 4 is the upper ball, while the lower ball 56 is maintained generally in alignment with the upper ball 46 in a similar arrangement. Wear plates 78 are provided to provide a wear resistant surface upon which the ball 46 may roll when the head assembly 14 is moved relative to the base assembly 12.

Figure 6:
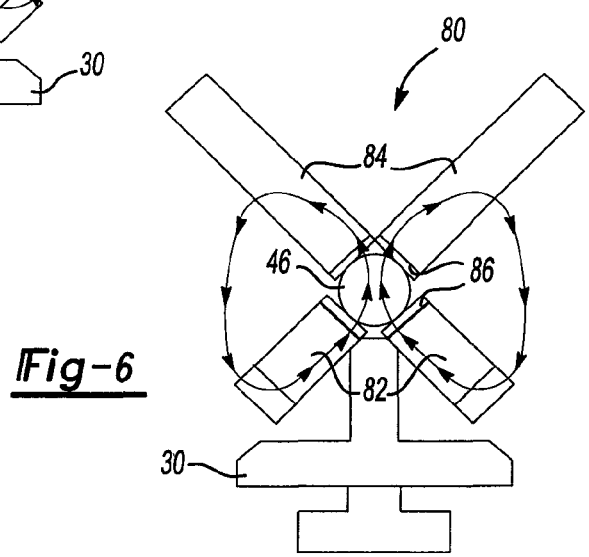
FIG. 6 is a diagrammatic top plan view of another alternative embodiment of a head actuator.

Referring to FIG. 6, a further embodiment of the present invention referred to as the head assembly magnet embodiment 80 is shown to include a pair of head magnets 82 that are assembled to the frame 30. Magnetically attracted members 84 are provided on the base assembly 12. The magnetically attracted members 84 may be steel or other ferrous material. Wear plates 86 may be provided in conjunction with or in addition to the magnetically attracted members 84 and the head magnets 82 to provide a wear surface over which the ball 46 may roll. A lower track may be provided that rolls on a ball 56 in like manner.

Figure 7:
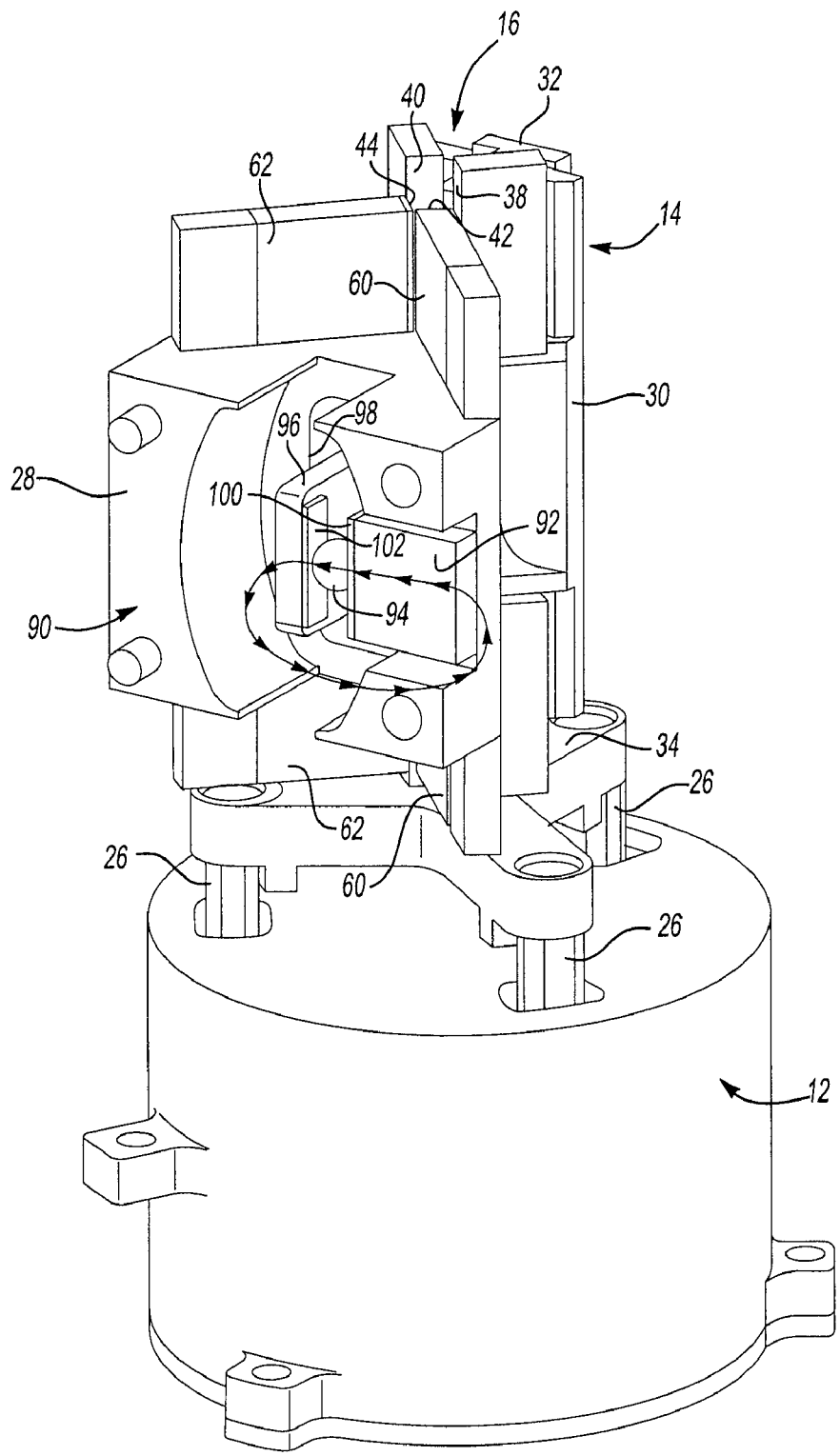
FIG. 7 is a side perspective view of an anti-rotation guide portion of the head actuator.

Referring to FIG. 7, an anti-rotation guide system 90 is shown in conjunction with the base assembly 12 and head assembly 14 that define the linear motion track 16 as previously described. The anti-rotation guide system 90 may be used in conjunction with the linear motion track 16 having a magnetic coupling system 18, as previously described with reference to FIGS. 1-5. The anti-rotation guide system 90 includes a magnet 92 and a ball 94 that cooperate with an anti-rotation flange 96 of the frame 30. The anti-rotation flange 96 extends through a slot 98 formed in the tower 28 of the base assembly 12. The oval line with arrowheads that passes through the magnet 92, ball 94 and anti-rotation flange 96 is provided to indicate the flux path of the anti-rotation guide system 90. The magnet 92 exerts a biasing force through the magnetic flux field that biases the anti-rotation flange 96 into engagement with the ball 94. A wear plate 100 may be provided on the magnet 92. Another wear plate 102 may be provided on the anti-rotation flange 96. The wear plate may be made of ferrous or ceramic material and may form part of the magnetic coupling system that couples the anti-rotation flange 96 to the magnet 92. The anti-rotation flange 96 may be moved when the linear motor moves the legs 26 to move the head assembly 14 as it tracks the data storage tape. When the frame 30 of the head assembly 14 moves up and down, as shown in FIG. 6, the anti-rotation flange 96 rolls the ball 94 between the wear plate 100 on the magnet 92 and wear plate 102 on the flange 96.

Figure 8:
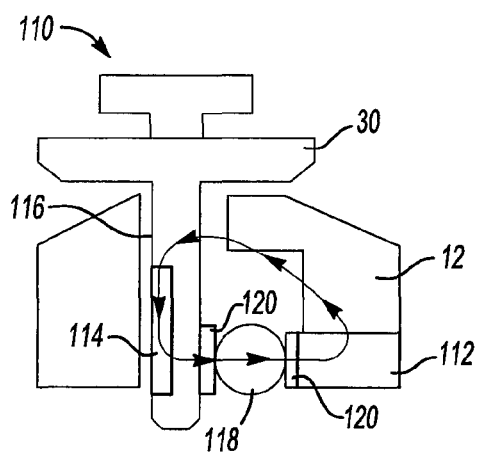
FIG. 8 is a diagrammatic top plan view of an alternative embodiment of an anti-rotation guide portion of a head actuator.

Referring to FIG. 8, a dual magnet anti-rotation system 110 is shown to include a magnet 112 that is attached to the base assembly 12 and a magnet 114 that is attached to the frame 30. A magnetic flux path is illustrated by the elliptical line with arrowheads that extends from the magnet 112 to the magnet 114 and through the ball 118. The magnets 112, 114 retain the ball 118 between the anti-rotation flange 116 and the base 12. Wear plates 120, as previously described, are provided for engagement with the ball 118 to reduce wear on the component parts of the dual magnet anti-rotation system 110 when the frame 30 rolls on the ball 118 relative to the base assembly 12. Wear plates 120 may also be included in the flux path if made of ferrous material.

Figure 9:
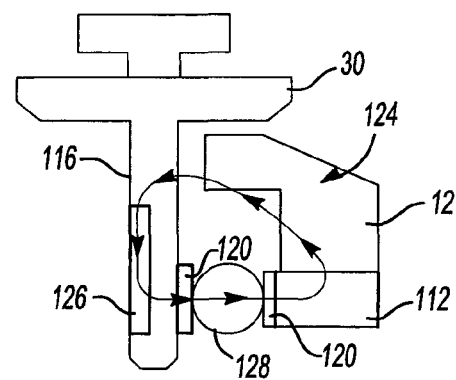
FIG. 9 is a diagrammatic top plan view of an alternative embodiment of an anti-rotation guide portion of a head actuator.

Referring to FIG. 9, a magnet anti-rotation system 124 is shown to include a magnet 126 that is attached to the frame 30 of the head assembly 14. A magnetic flux path is illustrated by the elliptical line with arrowheads that extend from the magnet 126 through the wear plates 120 and through the ball 128. The wear plate 120 on the base 12, if made of a ferrous material, may function as the magnetically attracted portion of the base 12. The magnet 126 retains the ball 128 between the anti-rotation flange 116 and the base 12. Wear plates 120, as previously described, are provided for engagement with the ball 128 to reduce wear on the component parts of the anti-rotation system 124 when the frame 30 rolls on the ball 128 relative to the assembly 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An anti-rotation guide apparatus for a transducer positioning apparatus of a data storage machine that reads and writes data to a storage medium, a base, a tower extending from the base at one end, a transducer head for reading and writing data to a storage medium that is secured to a frame, the frame is movably attached to the tower for limited movement toward and away from the base, the transducer head is pivotable to limited extent with the frame relative to the tower about a pivot axis when the storage medium reverses direction, the anti-rotation guide apparatus comprising;
    an anti-rotation flange of the frame that extends radially from the pivot axis;
    a ball disposed proximate the anti-rotation flange of the frame;
    a magnet attached to the tower that acts upon the anti-rotation flange of the frame to bias the transducer head against rotation about the pivot axis when the storage medium reverses direction, wherein the frame rolls on the ball relative to the tower.

2. The apparatus of claim 1 wherein the ball is disposed between the anti-rotation flange of the frame and the magnet, wherein the frame rolls on the ball as the transducer head moves toward and away from the base.

3. The apparatus of claim 1 further comprising a linear guide track that guides the movement of the transducer head relative to the base.

4. The apparatus of claim 3 wherein the linear guide track is split into two portions, wherein a first portion is disposed above the anti-rotation flange of the frame and a second portion is disposed below the anti-rotation flange of the frame.

5. The apparatus of claim 4 wherein the tower defines a slot between the first and second portions of the track and wherein the anti-rotation flange of the frame is received in the slot.

6. The apparatus of claim 1 wherein the storage medium is a data storage tape.

7. The apparatus of claim 1 wherein the ball is disposed between the anti-rotation flange of the frame and the magnet, wherein the frame rolls on the ball as the head moves toward and away from the base, and a wear plate is disposed between the magnet and the ball.

* * * * *